United States Patent
Brant et al.

(10) Patent No.: US 8,590,931 B2
(45) Date of Patent: Nov. 26, 2013

(54) STEERING COLUMN COVER SKIRT ATTACHMENT

(75) Inventors: Andrew Brant, Brighton, MI (US); Thomas Mally, Beverly Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 78 days.

(21) Appl. No.: 13/283,661

(22) Filed: Oct. 28, 2011

(65) Prior Publication Data
US 2013/0106129 A1 May 2, 2013

(51) Int. Cl.
*B60R 21/05* (2006.01)
*B62D 37/00* (2006.01)

(52) U.S. Cl.
USPC ............... 280/752; 280/779; 180/90; 296/72

(58) Field of Classification Search
CPC ........................................ B60K 37/04
USPC ............ 280/779; 74/492, 493; D12/117, 192; 180/78, 90; 296/192, 70, 72
See application file for complete search history.

(56) References Cited

U.S. PATENT DOCUMENTS

| | | | | |
|---|---|---|---|---|
| 4,212,415 A * | 7/1980 | Neely | | 222/231 |
| 4,411,331 A * | 10/1983 | Hanada | | 180/78 |
| 4,535,197 A * | 8/1985 | Butler | | 174/41 |
| 4,668,004 A * | 5/1987 | Tsunoda et al. | | 296/70 |
| 5,699,601 A * | 12/1997 | Gilliam et al. | | 29/278 |
| 7,360,964 B2 * | 4/2008 | Tsuya et al. | | 403/280 |
| 7,753,423 B2 * | 7/2010 | Zellner, Jr. | | 296/1.08 |
| 8,297,137 B2 * | 10/2012 | Dole | | 74/1 R |
| 2002/0093223 A1 * | 7/2002 | Hedderly | | 296/192 |
| 2005/0054229 A1 * | 3/2005 | Tsuya et al. | | 439/280 |
| 2006/0138804 A1 * | 6/2006 | Jegal | | 296/192 |
| 2007/0145731 A1 * | 6/2007 | Ikeda et al. | | 280/775 |
| 2010/0083787 A1 * | 4/2010 | Buchheit | | 74/493 |

OTHER PUBLICATIONS

2012 Infiniti EX, Nissan Motor Co. Ltd., Draft of design release document, Date Unknown.

* cited by examiner

*Primary Examiner* — Karen Beck
(74) *Attorney, Agent, or Firm* — Young, Basile, Hanlon & MacFarlane, P.C.

(57) ABSTRACT

Disclosed herein are embodiments of a steering column cover skirt attachment bracket and steering column assemblies for a vehicle. One embodiment of a steering column assembly comprises a steering column having a steering column cover, an instrument panel and a lower driver panel forming a recess for receiving the steering column and steering column cover and having an interior surface and an attachment tower extending from the interior surface. The attachment tower is configured to couple the lower driver panel to the instrument panel. A steering column cover skirt extends between the steering column cover and the lower driver panel and has a first end attached to the steering column cover and a second end attached to the lower driver panel. A skirt attachment bracket has a body and a clip structure, wherein the body is attached to the second end of the steering column cover skirt and the clip structure is engaged with the attachment tower to retain the second end of the steering column cover skirt to the lower driver panel.

19 Claims, 7 Drawing Sheets

STEERING COLUMN COVER SKIRT ATTACHMENT

TECHNICAL FIELD

The embodiments herein relate to a steering column cover skirt attachment and in particular to a bracket for attaching the steering column cover skirt to a lower panel.

BACKGROUND

The steering column of a vehicle is typically covered by a steering column cover positioned adjacent to both an instrument panel and a lower driver side panel. The steering column cover can include a skirt of flexible material that extends from the steering column cover to the instrument panel or lower driver side panel to close the gap between the steering column cover and either or both of the instrument and lower driver's side panel. Installing the skirt can include blindly clipping the skirt onto the lower driver panel and then installing the lower driver panel onto the instrument panel. Because the installation of the skirt to the lower panel is done blindly, the installation can result in incorrectly installed skirts, presenting quality perception issues, for example.

SUMMARY

Disclosed herein are embodiments of a steering column cover skirt attachment bracket and steering column assemblies for a vehicle. One embodiment of a steering column assembly comprises a steering column having a steering column cover, an instrument panel and a lower driver panel forming a recess for receiving the steering column and steering column cover and having an interior surface and an attachment tower extending from the interior surface. The attachment tower is configured to couple the lower driver panel to the instrument panel. A steering column cover skirt extends between the steering column cover and the lower driver panel and has a first end attached to the steering column cover and a second end attached to the lower driver panel. A skirt attachment bracket has a body and a clip structure, wherein the body is attached to the second end of the steering column cover skirt and the clip structure is engaged with the attachment tower to retain the second end of the steering column cover skirt to the lower driver panel.

An embodiment of a steering column cover skirt attachment bracket comprises a body having a skirt attachment structure and opposing distal ends and a clip structure extending from each of the opposing distal ends of the body, the clip structure comprising four bearing surfaces configured to frictionally contact an attachment tower.

BRIEF DESCRIPTION OF THE DRAWINGS

The various features, advantages and other uses of the present apparatus will become more apparent by referring to the following detailed description and drawing in which.

DETAILED DESCRIPTION

Figure 1:
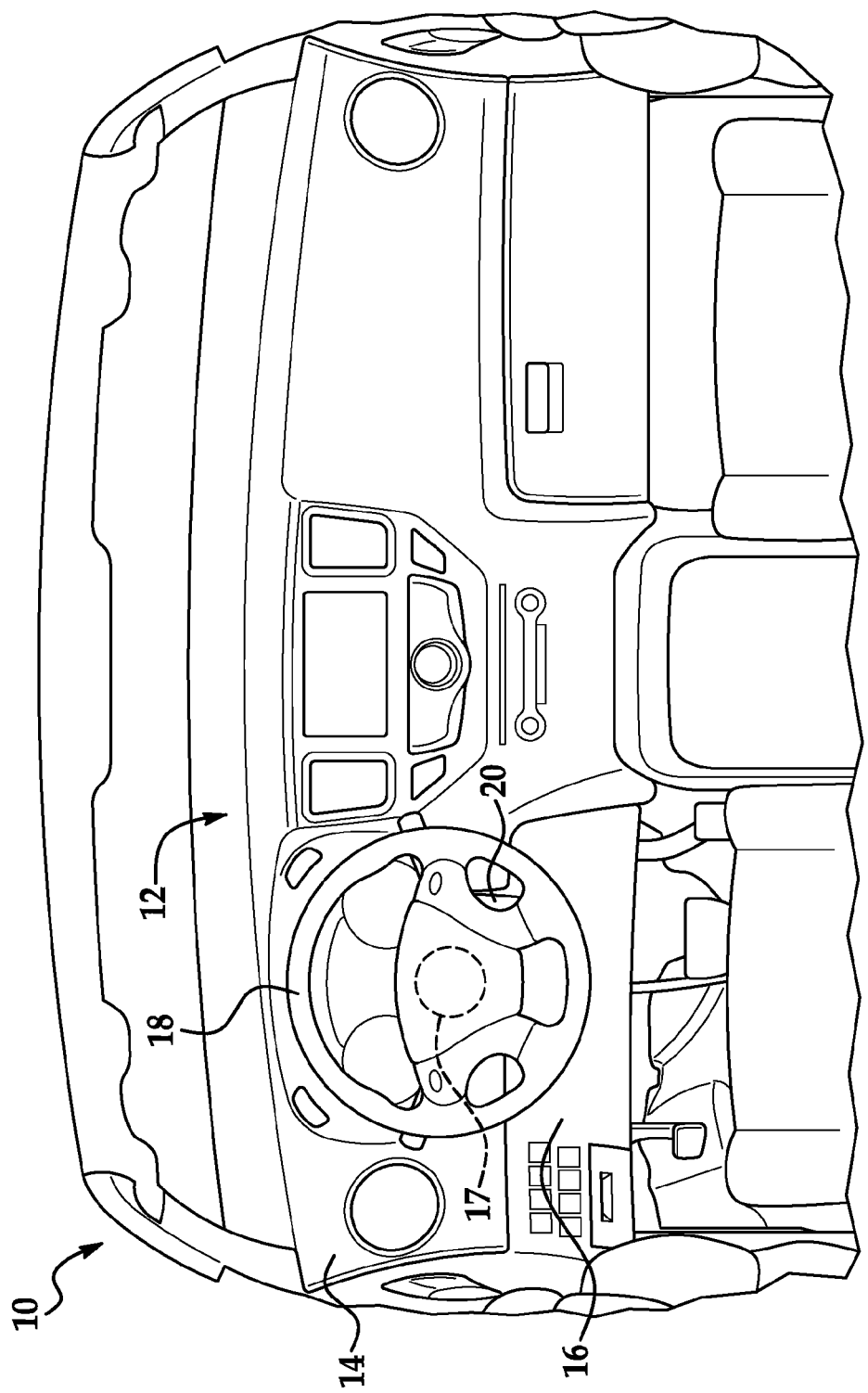
FIG. 1 is a perspective view of an instrument panel assembly from within the passenger compartment of a vehicle.

FIG. 1 illustrates a typical forward compartment of a vehicle 10 having a dash board 12 extending the width of the vehicle 10 with an instrument panel 14, lower driver panel 16 and a steering wheel 18 on the driver's side of the vehicle 10. Due to the high visibility of this section of the vehicle, aesthetics must be considered along with other considerations. Challenges of positioning the vehicle panels such as the instrument panel 14 and lower driver panel 16 in relation to one another include avoiding gaps while keeping attachment structures from view.

Figure 2:
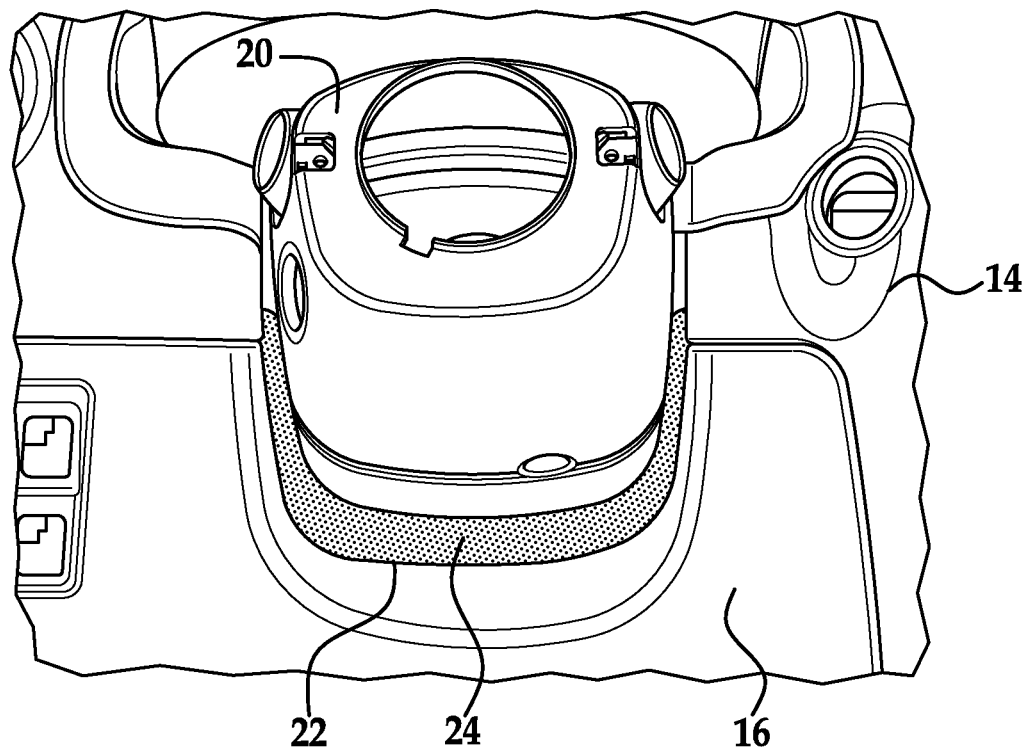
FIG. 2 is an enlarged front view of a steering column assembly including an instrument panel, lower driver panel, steering column cover, and steering column cover skirt with the steering column and the steering wheel removed.

As seen in FIG. 1, the steering wheel 18 is positioned between the instrument panel 14 and the lower driver panel 16 on the driver's side. The steering wheel 18 extends from a steering column 17 which has a steering column cover 20 which is positioned around the steering column 17. FIG. 2 is an enlarged view of this area with the steering wheel 18 and steering column 17 removed. The steering column cover 20 is located between the instrument panel 14 and lower driver panel 16 in a recess 22 formed in the lower driver panel 16 as illustrated in FIG. 2. A gap can exist between the steering column cover 20 and the lower driver panel 16, and perhaps portions of the instrument panel 14, especially when the steering wheel 18 is configured to be moved relative to the dash 12, in a telescoping or tilting manner, for example. The gap is hidden from view by a steering column cover skirt 24 extending between the steering column cover 20 and the lower driver panel 16 with a first end 26 of the steering column cover skirt 24 attached to the steering column cover 20 and a second end 28 attached to the lower driver panel 16.

Figure 3:
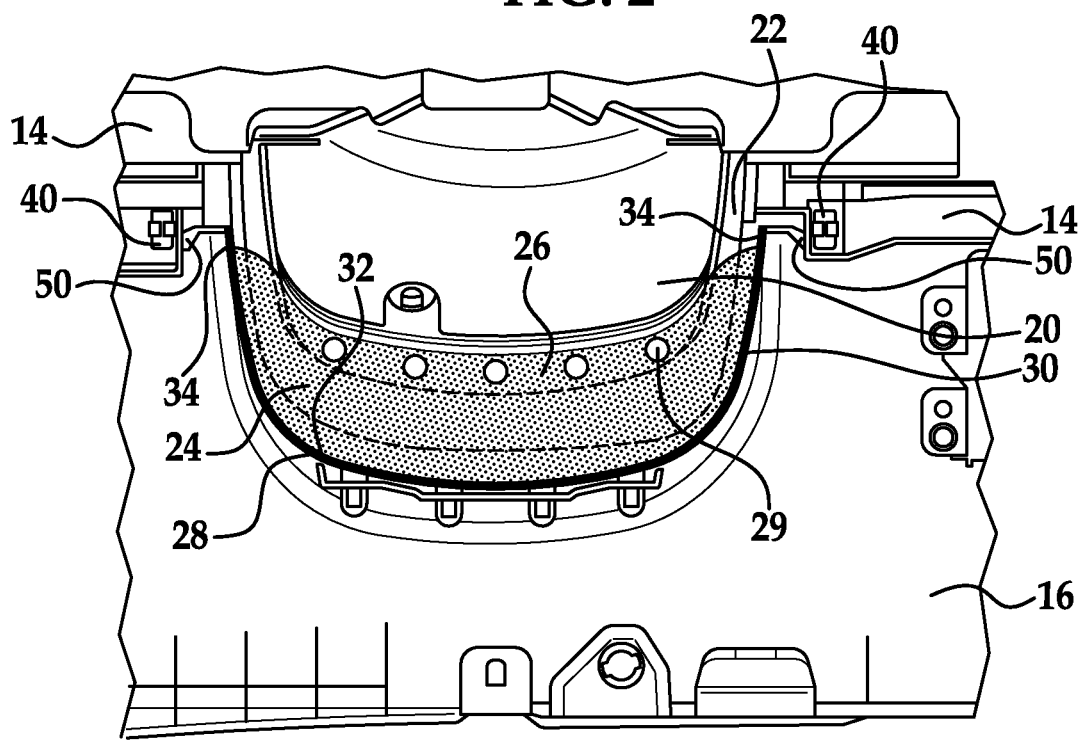
FIG. 3 is a rear view of the steering column assembly of FIG. 2.

FIG. 3 is a rear view (i.e. looking toward the rear of the vehicle) of the steering column assembly of FIG. 2. FIG. 3 illustrates the attachment structure 29 for the steering column cover skirt 24 at its first end 26 to the steering column cover 20. The attachment structure 29 of can be molded heat stake projections that extend from the steering column cover 20 through apertures in the first end 26 of the steering column cover skirt 24, with the projections being melted during a heat staking process to retain the first end 26 of the steering column cover skirt 24 attached to the steering column cover 20. The second end 28 of the steering column cover skirt 24 is attached to the lower driver panel 16 with a skirt attachment bracket 30, shown installed in FIG. 3.

The skirt attachment bracket 30 has a body 32 and a clip structure 50 at a distal end 34 of the body 32. In FIG. 3, the clip structure 50 is partially hidden from view by the instrument panel 14. Prior to installation, the steering column cover skirt 24 is attached to the skirt attachment bracket 30 by wrapping the second end 28 of the steering column cover skirt 24 around the body 32 of the skirt attachment bracket 30 and fixing the steering column cover skirt 24 to the body 32 of the skirt attachment bracket with adhesive or mechanical fasteners, such as staples. The first end 26 of the steering column cover skirt 24 is attached to the steering column cover 20 and the second end 28 of the steering column cover skirt 24 is attached to the lower driver panel 16 with the skirt attachment bracket 30. The lower driver panel 16 is then attached to the instrument panel 14, with the clip structure 50 being finally positioned partially between the instrument panel 14 and the lower driver panel 16.

Figure 4:
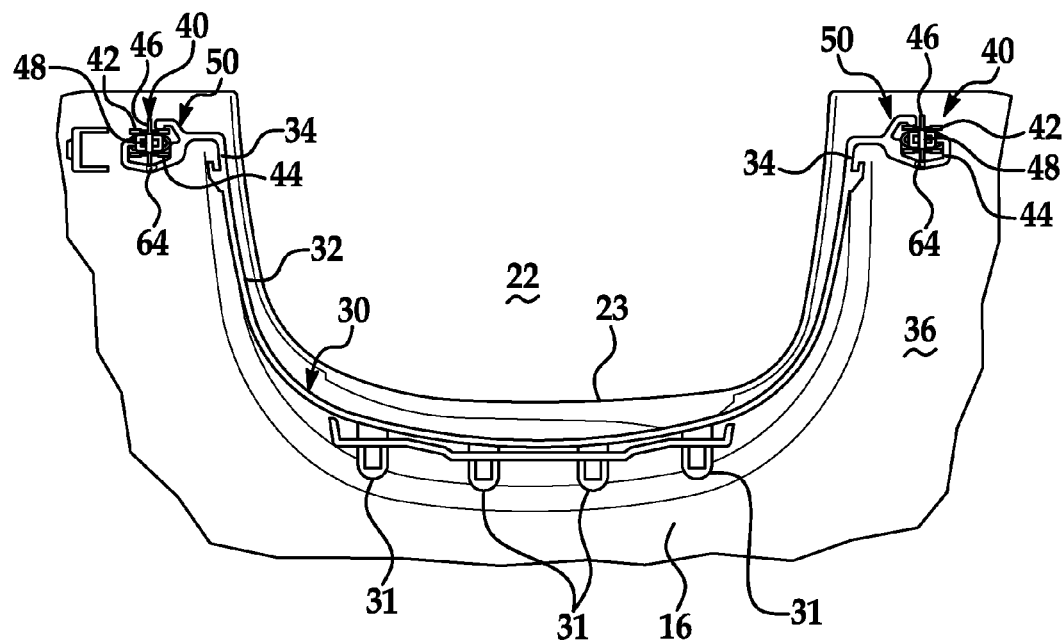
FIG. 4 is a rear view of the skirt attachment bracket and lower driver panel as shown in FIG. 3.

In FIG. 4, the instrument panel 14 and steering column cover 20 are removed to better see the skirt attachment bracket 30 attached to the lower driver panel 16. The lower driver panel 16 has an interior surface 36 from which at least one attachment tower 40 extends. The attachment tower 40 is configured to couple the instrument panel 14 to the lower driver panel 16. Two attachment towers 40 are shown in the figures; however, any number desired or required by those skilled in the art is contemplated. The attachment tower 40 has a first wall 42, a second wall 44 extending parallel to the first wall 42, and a third wall 46 extending transverse to the first and second walls 42, 44. An instrument panel clip 48 is located on the third wall 46 between the first and second walls 42, 44 and is configured to retain the instrument panel 14 on the attachment tower 40. The clip structure 50 engages the attachment tower 40 between the lower driver panel 16 and the instrument panel 14 to retain the second end 28 of the steering column cover skirt 24 to the lower driver panel 16.

Figure 5:
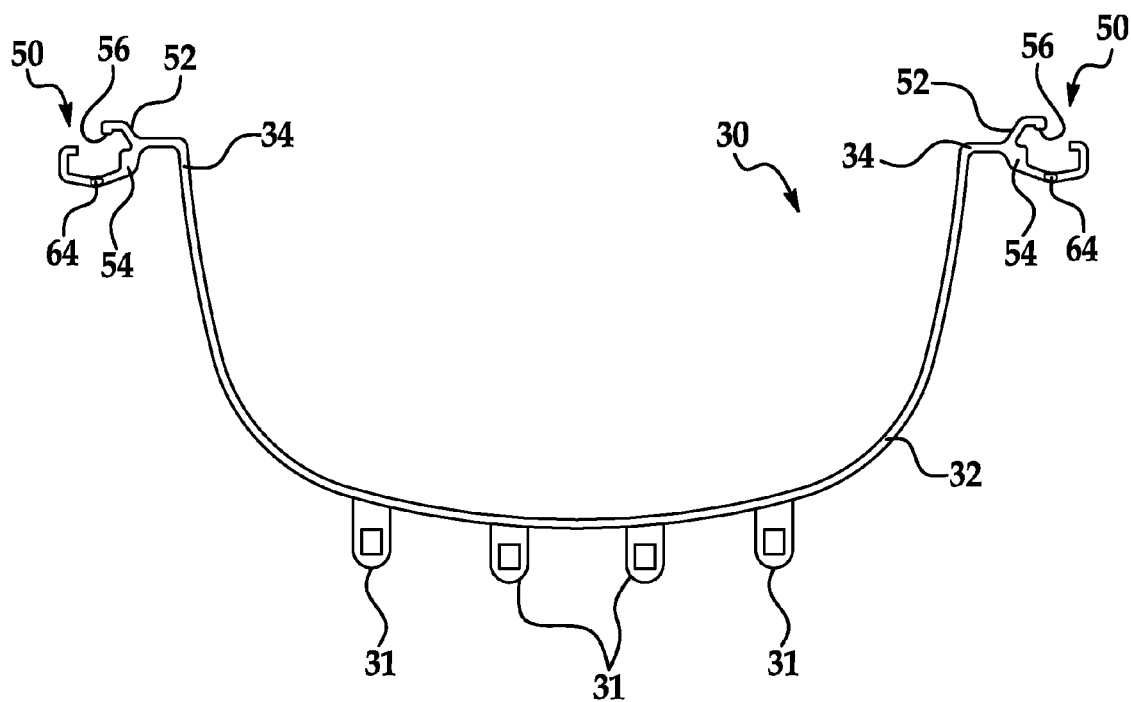
FIG. 5 is a perspective view of the skirt attachment bracket.

FIG. 5 illustrates the skirt attachment bracket 30. The body 32 of the skirt attachment bracket 30 generally follows the shape of the recess 22. The body 32 can be configured to attach to the lower driver panel 16 proximate a perimeter 23 of the recess 22. One or more clip members 31 extend from the body 32 at locations along the body 32 to secure the second end 28 of the steering column cover skirt 24 to the lower driver panel 16, as shown in FIG. 4. Extending from the interior surface 36 of the lower driver panel 16 are respective attachment structures to which the clip members 31 attach. The clip members 31 are provided by means of example and are not meant to be limiting. Any fastening structure known to those skilled in the art can be used.

As shown in FIGS. 4 and 5, opposing distal ends 34 of the body 32 have mirror-image clip structures 50 each located on opposite sides of the recess 22. This is provided by means of illustration and is not meant to be limiting. The body 32 can be any shape that sufficiently retains the steering column cover skirt 24 in its gap-filling position. At each distal end 34 of the skirt attachment bracket 30 is shown a clip structure 50. It is contemplated herein that only one distal end 34 may have a clip structure 50 extending there from. It is further contemplated herein that more than two clip structures 50 may extend from the body 32. As a non-limiting example, a clip structure 50 may be incorporated at the mid point of the body 32.

Figure 6:
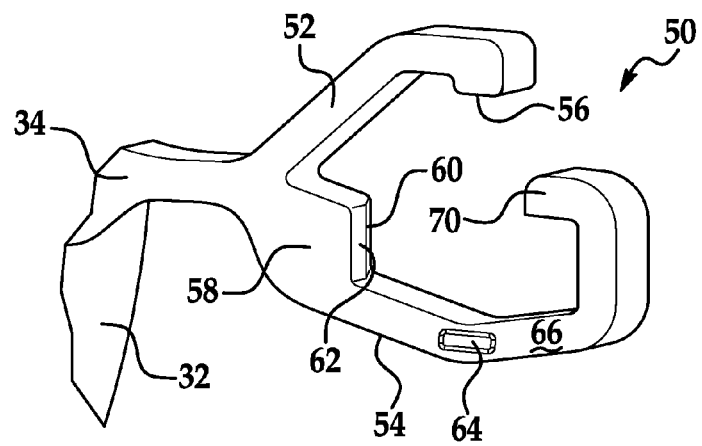
FIG. 6 is an enlarged perspective view of a clip structure of an embodiment of the skirt attachment bracket.
Figure 8:
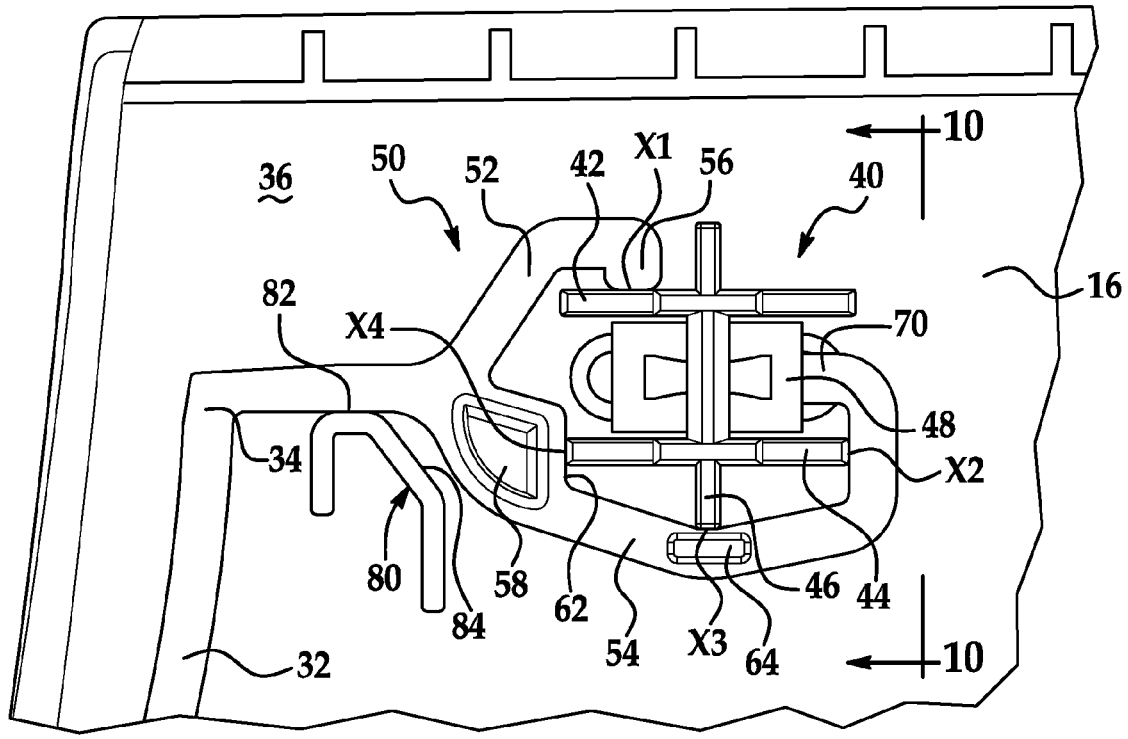
FIG. 8 is a rear close-up view of the clip structure of FIG. 6 installed on the attachment tower of the lower driver panel.

FIG. 6 is an enlarged perspective view of the clip structure 50. The clip structure 50 has a first arm 52 and a second arm 54 extending in a G-shaped configuration. The clip structure 50 is configured to contact the attachment tower 40 at four contact points, as shown in FIG. 8. The contact points can be such that the attachment tower 40 acts as a projection around which the clip structure 50 is positioned. The contact points can be bearing surfaces configured to frictionally contact an attachment tower 40 such that the clip structure 50 grips the attachment tower 40. A range of contact pressure is contemplated herein and is not limited by this disclosure.

Figure 7:
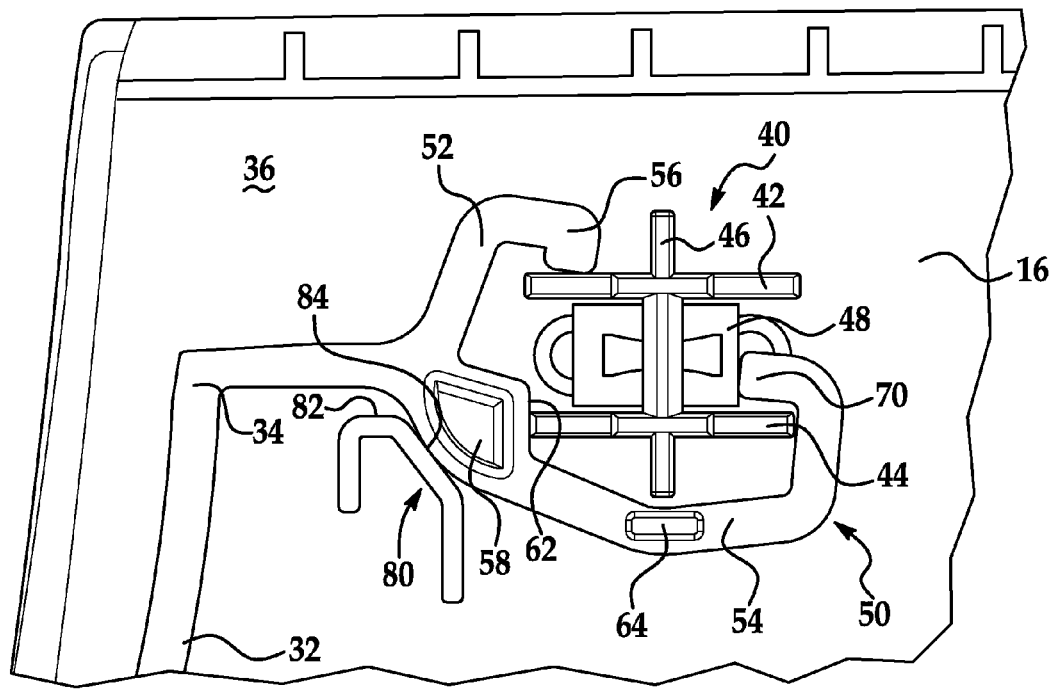
FIG. 7 is an enlarged perspective view of the clip structure of FIG. 6 being installed to a lower driver panel.
Figure 9:
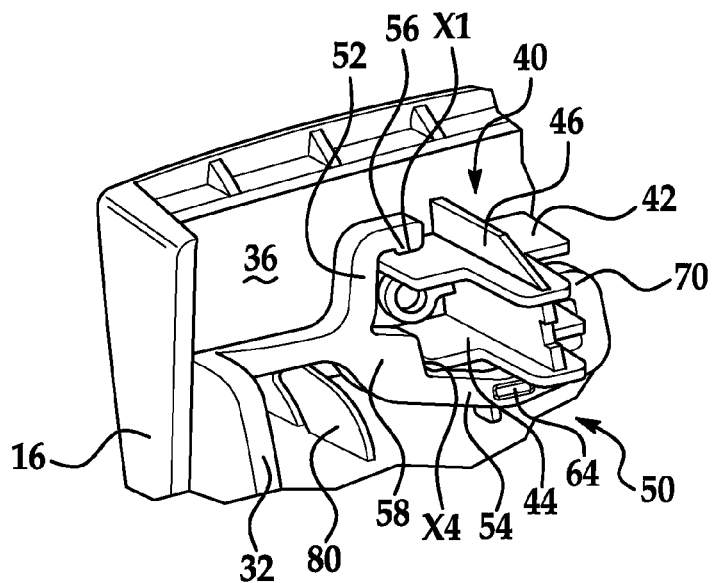
FIG. 9 is a perspective view of the clip structure installed on the attachment tower of the lower driver panel in FIG. 8.

FIGS. 7-9 illustrate the relationship between the clip structure 50 and the attachment tower 40. The first arm 52 of the clip structure 50 has a tower stand-off projection 56 configured to contact the first wall 42 of the attachment tower 40 at the first point x1 of the four contact points. The second arm 54 of the clip structure 50 contacts the second wall 44 at a second point x2 of the four contact points and the third wall 46 at a third point x3 of the four contact points. The second arm 54 also contacts the second wall 44 at a fourth contact point x4 of the four contact points.

The second arm 54 can have a locate structure 58 with a guide surface 60 and a locate surface 62. The guide surface 60 is angled from the locating surface 62 toward the body 32 of the skirt attachment bracket 30, as seen in FIG. 6. The guide surface 60 contacts the second wall 44 at the fourth point x4 of the four contact points to guide the locate surface 62 toward contact with the second wall 44 at the fourth point x4 during installation of the skirt attachment bracket 30 to the lower driver panel 16 by pushing the clip structure 50 toward the recess 22 so that the locate structure 58 is sandwiched between a guide surface 84 of a locating rib 80 and the second wall 44. When installed, it is the locate surface 62 that contacts the attachment tower 40 at the fourth point x4 of the four contact points.

With the clip structure 50 installed on the attachment tower 40, the first point x1 is positioned opposite the third point x3 such that movement of the clip structure 50 in a vertical direction parallel to the interior surface 36 of the lower driver panel 16 is prevented. Similarly, the second point x2 is positioned opposite the fourth point x4 such that movement of the clip structure 50 in a horizontal direction parallel to the interior surface 36 of the lower driver panel 16 is prevented. Finally, with the clip structure 50 sandwiched between the lower driver panel 16 and the instrument panel 14 after attachment of the lower driver panel 16 to the instrument panel via the attachment tower 40, the clip structure is prevented from moving in a direction away from the interior surface 36 of the lower driver panel 16. In addition, when a clip structure 50 is located at each distal end 34 of the body 32 of the skirt attachment bracket 30, each of the four contact points x1-x4 of one clip structure 50 is located opposite to each of the four contact points x1-x4 of the second clip structure 50, thereby preventing movement of the skirt attachment bracket 30 in a direction parallel to the interior surface 36 of the lower driver panel 16.

Figure 10:
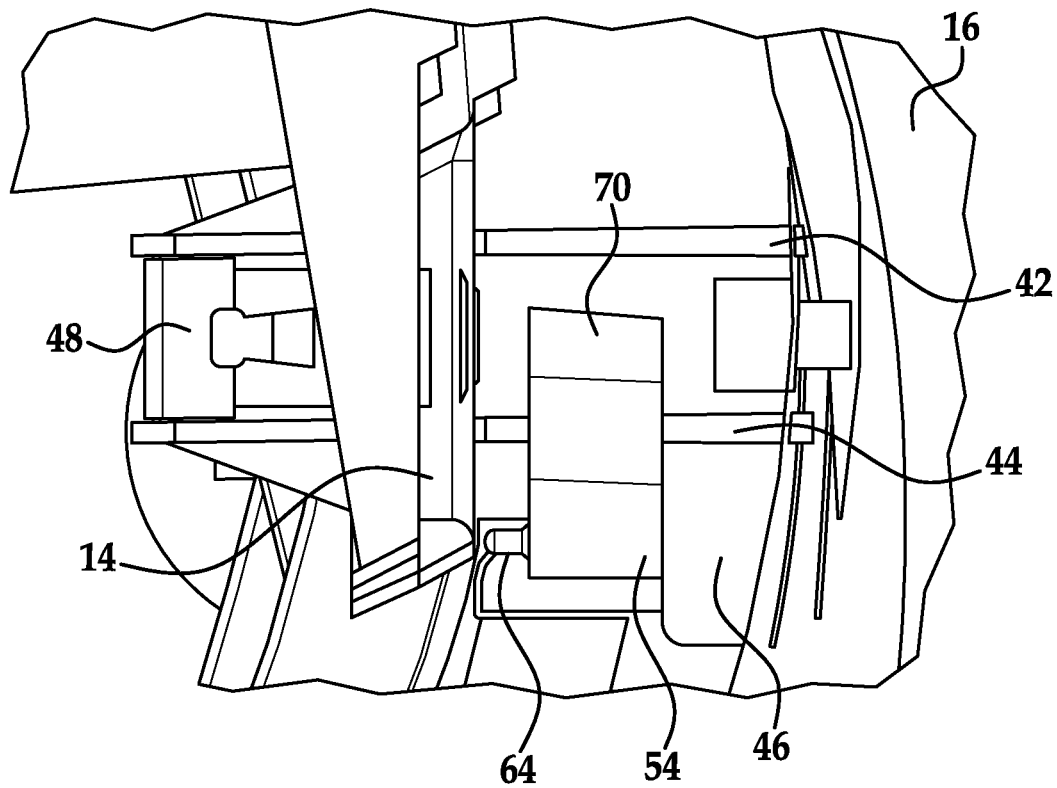
FIG. 10 is an enlarged cross sectional view of FIG. 8 along line 10-10.

The clip structure 50 can have an instrument panel stand-off projection 64. For example, as illustrated, the instrument panel stand-off projection 64 can extend from a surface 66 of the second arm 54 that is opposite the lower driver panel 16 when installed. The instrument panel stand-off projection 64 is configured to maintain a predetermined distance between the instrument panel 14 and the lower driver panel 16. This is best seen in FIG. 10, a cross sectional view of the instrument panel 14 attached to the lower driver panel 16. This predetermined distance can maintain a desired fit and finish of the lower driver panel 16 to the instrument panel 14, as well as prevent noise and vibrations from occurring during operation of the vehicle while preventing wear on the otherwise contacting surfaces.

The clip structure 50 can have a clip retention projection 70 extending in an orientation that positions the clip retention projection 70 between the instrument panel clip 48 and the interior surface 36 of the lower driver panel 16. The instrument panel clip 48 is configured to be moved between a compressed configuration shown in FIG. 7 and a retention configuration shown in FIG. 8. During installation of the skirt attachment bracket 30 to the attachment tower 40, the clip retention projection 70 contacts the instrument panel clip 48 and moves the instrument panel clip 48 to the compressed configuration as the clip retention projection 70 slides along the instrument panel clip 48. When the clip retention projection 70 has passed over the instrument panel clip 48, the instrument panel clip 48 returns to the retention configuration, effectively retaining the clip retention projection 70 between the lower driver panel 16 and the instrument panel clip 48. The clip retention projection 70 does not contact the attachment tower 40 at one of the four contact surfaces. However, the clip retention projection 70 can contact the attachment tower 40. With the clip retention projection 70 positioned between the interior surface 36 of the lower driver panel 16, the clip structure 50 is prevented from moving away from the interior surface 36 of the lower driver panel 16, thus holding the skirt attachment bracket 30 in place with respect to the lower driver panel 16 as the lower driver panel is being attached to the instrument panel 14.

The lower driver panel 16 can include a locating rib 80 extending from its interior surface 36 and configured to guide installation of the clip structure 50 onto the attachment tower 40. The locating rib 80 can include a support surface 82 for supporting the body 32 of the skirt attachment bracket 30 when the skirt attachment bracket 30 is installed to the lower driver panel 16, as shown in FIG. 8. The locating rib 80 can also have a guide surface 84 for guiding the clip structure 50 into correct orientation to engage the attachment tower 40 during installation, as shown in FIG. 7.

Figure 11:
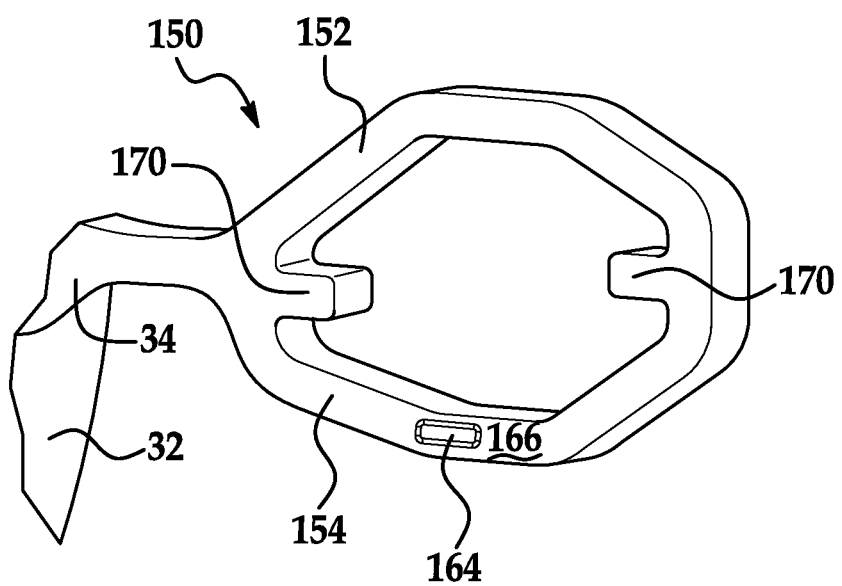
FIG. 11 is a close up perspective view of a clip structure of another embodiment of a skirt attachment bracket disclosed herein.

Another embodiment of the skirt attachment bracket 30 can have a clip structure 150 that has an O-shape configuration that surrounds the attachment tower 40 when the skirt attachment bracket 30 is installed to the lower driver panel 16. FIG. 11 is an enlarged perspective view of the clip structure 150. The clip structure 150 has a first side 152 and a second side 154 meeting at each end to form the O-shaped configuration. The clip structure 150 is configured to contact the attachment tower 40 at six contact points, shown in FIG. 12.

Figure 12:
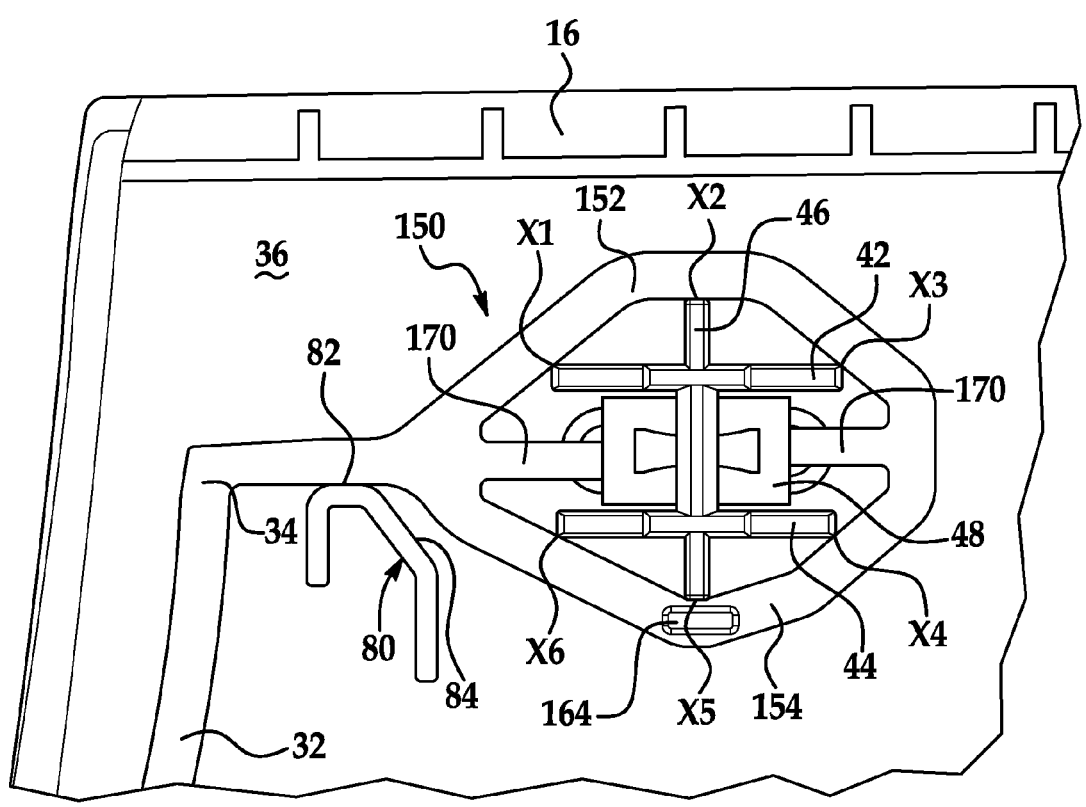
FIG. 12 is a close-up rear view of the embodiment of FIG. 11 installed on an attachment tower.

FIG. 12 illustrates the relationship between the clip structure 150 and the attachment tower 40. The first side 152 of the clip structure 150 contacts the attachment tower 40 at three of the six contact points. The first contact point x1 and the third contact point x3 are at opposite ends of the first wall 42. The second contact point x2 is on the third wall 46 of the attachment tower 40. The second side 154 of the clip structure 150 contacts the attachment tower 40 at the other three of the six contact points. The fourth contact point x4 and the sixth contact point x6 are at opposite ends of the second wall 44. The fifth contact point x5 is on the third wall 46 of the attachment tower 40 opposite the second contact point x2.

The clip structure 150 can have an instrument panel stand-off projection 164. For example, as illustrated, the instrument panel stand-off projection 164 can extend from a surface 166 of the second side 154 that is opposite the lower driver panel 16 when installed. The instrument panel stand-off projection 164 is configured to maintain a predetermined distance between the instrument panel 14 and the lower driver panel 16 such as described with reference to the earlier embodiment.

The clip structure 150 can have one or more clip retention projections 170 extending in an orientation that positions the clip retention projections 170 between the instrument panel clip 48 and the interior surface 36 of the lower driver panel 16. The instrument panel clip 48 is configured to be moved between a compressed configuration as described with reference to FIG. 7 and a retention configuration as described with reference to FIG. 8. When the clip retention projections 170 have passed over the instrument panel clip 48, the instrument panel clip 48 returns to the retention configuration, effectively retaining the clip retention projections 170 between the lower driver panel 16 and the instrument panel clip 48. The clip retention projections 170 do not contact the attachment tower 40 at one of the six contact surfaces. However, the clip retention projections 170 can be configured to contact the attachment tower 40.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A steering column assembly for a vehicle comprising:
   a steering column having a steering column cover;
   an instrument panel;
   a lower driver panel having an interior surface and an attachment tower extending from the interior surface, the attachment tower configured to directly couple the lower driver panel to the instrument panel;
   a steering column cover skirt extending between the steering column cover and the lower driver panel and having a first end attached to the steering column cover and a second end attached to the lower driver panel; and
   a skirt attachment bracket having a body and a clip structure, wherein the body is attached to the second end of the steering column cover skirt and the clip structure is directly engaged with the attachment tower to retain the second end of the steering column cover skirt to the lower driver panel.

2. The steering column assembly of claim 1, wherein the clip structure is configured to contact the attachment tower at four contact points.

3. The steering column assembly of claim 2, wherein the clip structure has a first arm and a second arm extending in a G-shaped configuration.

4. The steering column assembly of claim 3, wherein the attachment tower has a first wall, a second wall extending parallel to the first wall, and a third wall extending transverse to the first and second walls, with the first arm contacting the first wall at a first point of the four contact points, the second arm contacting the second wall at a second point of the four contact points and the third wall at a third point of the four contact points.

5. The steering column assembly of claim 4, wherein the first arm has a tower stand-off projection configured to contact the first wall at the first point of the four contact points.

6. The steering column assembly of claim 4, wherein the second arm contacts the second wall at a fourth point of the four contact points.

7. The steering column assembly of claim 2, wherein each of the four contact points is located on a side of the attachment tower opposite another of the four contact points such that movement of the clip structure parallel to the interior surface of the lower driver panel is prevented.

8. The steering column assembly of claim 2, wherein the clip structure has an O-shape configured to surround the attachment tower.

9. The steering column assembly of claim 1, wherein the clip structure has an instrument panel stand-off projection extending from a surface of the clip structure opposite the lower driver panel and configured to maintain a predetermined distance between the instrument panel and the lower driver panel.

10. The steering column assembly of claim 1, wherein the attachment tower has an first wall, a second wall extending parallel to the first wall, and a third wall extending transverse to the first and second walls, wherein an instrument panel clip is located on the third wall between the first and second walls and is configured to retain the instrument panel on the attachment tower, and wherein the clip structure has a clip retention projection extending in an orientation that positions the clip retention projection between the instrument panel clip and the interior surface of the lower driver panel.

11. The steering column assembly of claim 10, wherein the instrument panel clip is configured to be moved between a compressed configuration and a retention configuration, with the clip retention projection contacting the instrument panel clip and moving the instrument panel clip to the compressed configuration during installation of the clip structure to the attachment tower, and the instrument panel clip returning to the retention configuration after installation of the clip structure to the attachment tower.

12. The steering column assembly of claim 1, further comprising a rib extending from the interior surface of the lower driver panel and configured to guide installation of the clip structure onto the attachment tower, wherein the rib includes a support surface for supporting the body of the skirt attachment bracket and a guide surface for guiding the clip structure into correct orientation to engage the attachment tower.

13. The steering column assembly of claim 1, wherein:
the clip structure extends from a distal end of the body;
the body is configured to attach to the lower driver panel proximate a perimeter of a recess in the lower driver panel; and
an opposing distal end of the body has a mirror-image clip structure, with the clip structure and mirror-image clip structure located on opposite sides of the recess.

14. A steering column cover skirt attachment bracket comprising:
a body having a skirt attachment structure and opposing distal ends; and
a clip structure extending from each of the opposing distal ends of the body, the clip structure comprising four internal bearing surfaces configured to frictionally contact an attachment tower, wherein the four internal bearing surfaces define an internal clip perimeter configured to partially surround the attachment tower; and wherein the clip structure has a first arm and a second arm, wherein the first arm has a tower stand-off projection configured to be a first bearing surface, and wherein the second arm comprises a second bearing surface, a third bearing surface, and a fourth bearing surface.

15. The steering column cover skirt attachment bracket of claim 14, wherein the second arm has a distal end with a clip retention projection extending orthogonally from the distal end, wherein the clip retention projection is not one of the four internal bearing surfaces.

16. The steering column cover skirt attachment bracket of claim 14, wherein the clip structure has an instrument panel stand-off projection extending from the clip structure.

17. The steering column assembly of claim 1, wherein the clip structure at least partially surrounds the attachment tower and is positioned between the interior surface of the lower driver panel and the instrument panel.

18. The steering column assembly of claim 1, wherein the lower driver panel has a recess that forms an aperture when in place with the instrument panel, the aperture configured to receive the steering column and the steering column cover there through, with the steering column and the steering column cover being movable through the aperture relative to the instrument panel and the lower driver panel.

19. A steering column cover skirt attachment bracket comprising:
a body having a skirt attachment structure and opposing distal ends; and
a clip structure extending from each of the opposing distal ends of the body, the clip structure comprising four bearing surfaces configured to frictionally contact an attachment tower, wherein the clip structure has a first arm and a second arm extending in a G-shaped configuration.

* * * * *